(12) United States Patent
Urrutia

(10) Patent No.: US 8,046,281 B1
(45) Date of Patent: Oct. 25, 2011

(54) SYSTEM AND METHOD FOR AUTOMATING INITIAL CLAIM ASSIGNMENT

(75) Inventor: Roberta Urrutia, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 888 days.

(21) Appl. No.: 11/486,614

(22) Filed: Jul. 13, 2006

(51) Int. Cl.
*G06Q 40/00* (2006.01)
*G06Q 10/00* (2006.01)
*G06F 17/50* (2006.01)
*G06F 9/44* (2006.01)
*G06F 9/46* (2006.01)
*G06F 15/02* (2006.01)
*G05B 19/418* (2006.01)

(52) U.S. Cl. .................. 705/35; 705/1.1; 705/4; 705/7; 705/8; 705/9

(58) Field of Classification Search .............. 705/35, 705/1.1, 4, 7, 8, 9
See application file for complete search history.

(56) References Cited

U.S. PATENT DOCUMENTS

| | | | |
|---|---|---|---|
| 2,504,532 A | 4/1950 | Kahan | |
| 5,111,391 A * | 5/1992 | Fields et al. | 705/9 |
| 5,313,584 A | 5/1994 | Tickner et al. | |
| 6,249,715 B1 | 6/2001 | Yuri et al. | |
| 6,275,812 B1 * | 8/2001 | Haq et al. | 705/11 |
| 6,445,968 B1 * | 9/2002 | Jalla | 700/101 |
| 6,546,506 B1 | 4/2003 | Lewis | |
| 6,850,895 B2 | 2/2005 | Brodersen et al. | |
| 6,970,829 B1 * | 11/2005 | Leamon | 705/9 |
| 7,003,475 B1 * | 2/2006 | Friedland et al. | 705/9 |
| 7,127,716 B2 | 10/2006 | Jin et al. | |
| 7,184,541 B2 | 2/2007 | Tyagarajan et al. | |
| 7,263,183 B1 | 8/2007 | Klein et al. | |
| 7,769,617 B2 | 8/2010 | Iwasaki et al. | |
| 7,770,175 B2 | 8/2010 | Flockhart et al. | |
| 2002/0029161 A1 * | 3/2002 | Brodersen et al. | 705/9 |
| 2002/0055870 A1 | 5/2002 | Thomas | |
| 2003/0018762 A1 * | 1/2003 | Mullen | 709/223 |
| 2003/0061090 A1 * | 3/2003 | Marano | 705/9 |
| 2003/0167199 A1 | 9/2003 | Thomann et al. | |
| 2003/0177027 A1 | 9/2003 | DiMarco | |
| 2003/0177051 A1 | 9/2003 | Driscoll et al. | |
| 2004/0225535 A1 | 11/2004 | Bond, Jr. et al. | |
| 2005/0033619 A1 * | 2/2005 | Barnes et al. | 705/7 |
| 2005/0055697 A1 * | 3/2005 | Buco et al. | 718/105 |
| 2006/0053035 A1 * | 3/2006 | Eisenberg | 705/2 |

OTHER PUBLICATIONS

Butterworth, Paul, "Automating the Business Processes of Mission-Critical Distributed Applications," Forté Software, Inc., 1997, 27 pages.

(Continued)

*Primary Examiner* — Shahid R Merchant
(74) *Attorney, Agent, or Firm* — Schwegman, Lundberg & Woessner, P.A.

(57) ABSTRACT

Various embodiments disclosed herein are directed to automatically making an initial claim assignment. The systems include information collection subsystems, skills assessment subsystems and assignment recommendation subsystems that provide a customer service representative with a recommendation for the best-suited available claim handler. The customer service representative may accept or override the recommendation in making the claim handler assignment. The determination of the best-suited available claim handler is made by correlating these skills required for handling a particular claim, the skills of the claim handlers, and an algorithm takes into account the claim handler's current loss assignment count, number of hours spent, and future availability.

15 Claims, 10 Drawing Sheets

OTHER PUBLICATIONS

Friedemann, Solms Dr., "Integrated Business Process and System Design Via Urdad," *ITcon*, 1994, vol. 0, 1-10.

ITS, Inc., "Features: ITS Insurance Management System Key Features," 2004, 8 pages.

Katoh, H. et al., "OXTHAS: A Method for Balancing Loads in Workflow Management Systems with Web Services," Tokyo Institute of Technology, Mar. 2006, 12 pages.

Microsoft, "Microsoft BizTalk Server and Universal Application Network: Enabling Corss-Application Business Process Integration through Best-of-Breed Technologies," *CIO Magazine*, 2002, 1-21.

Siebel eBusiness, "Best Practices in Insurance Customer Service," Apr. 2003, 1-11.

"U.S. Appl. No. 11/486,613, Non Final Office Action mailed Oct. 5, 2009", 12 pgs.

"U.S. Appl. No. 11/486,613, Preliminary Amendment mailed Jun. 12, 2010", 3 pgs.

"U.S. Appl. No. 11/486,613, Response filed Jan. 5, 2010 to Non Final Office Action mailed Oct. 5, 2009", 12 pgs.

"U.S. Appl. No. 11/486,848, Preliminary Amendment mailed Jun. 12, 2007", 3 pgs.

U.S. Appl. No. 11/486,613, Final Office Action mailed Apr. 15, 2010, 16 pgs.

U.S. Appl. No. 11/486,613, Response filed Jul. 15, 2010 to Final Office Action mailed Apr. 15, 2010, 13 pgs.

U.S. Appl. No. 11/486,848, Non-Final Office Action mailed Aug. 12, 2010, 18 pgs.

Katoh, H., et al., "A Method for Balancing Loads in Workflow Management System with Web Services", Department of Computer Science, Tokyo Institute of Technology, Tokyo, Japan, (2005.).

U.S. Appl. No. 11/486,613, Non Final Office Action mailed Dec. 20, 2010, 20 pgs.

U.S. Appl. No. 11/486,613, Response filed Apr. 20, 2011 to Non Final Office Action mailed Dec. 20, 2010, 12 pgs.

U.S. Appl. No. 11/486,848, Final Office Action mailed Mar. 30, 2011, 24 pgs.

U.S. Appl. No. 11/486,848, Preliminary Amendment filed Jul. 26, 2010, 4 pgs.

U.S. Appl. No. 11/486,848, Response filed Jan. 12, 2011 to Non Final Office Action mailed Aug. 12, 2010, 11 pgs.

Ghizzioli, Roberto, et al., "An Ant-Based Algorithm for the Dynamic Task Allocation Problem", Technical Report No. TR/IRIDIA/2004-16, Universite Libre de Bruxelles, (Sep. 2004), 38 pgs.

Lee, Seungjin, et al., "A Meta Model Approach using UML for Task Assignment Policy in Software Process", Proceedings of the Ninth Asia-Pacific Software Engineering Conference (APSEC'02), IEEE Computer Society, (2002), 7 pgs.

Shen, Minxin, et al., "Multi-Criteria Task Assignment in Workflow Management Systems", Proceedings of the 36th Hawaii International Conference of System Science (HICSS'03), IEEE Computer Society, (2002), 9 pgs.

Yu, Jia, et al., "A Taxonomy of Workflow Management Systems for Grid Computing", Journal of Grid Computing, 3, Version 2, [online] Retrieved from the Internet: <URL:http://arxiv.org/abs/cs/0503025 >, (Apr. 13, 2005), 29 pgs.

\* cited by examiner

| DOMAIN VALUES | CLAIMS REP | SR CLAIMS REP | ASSOCIATE ADJUSTOR | 3RD ADJ - INJURY | SR EXAMINER - INJURY |
|---|---|---|---|---|---|
| TYPE OF LOSS - COLLISION | CAN | CAN | CAN | CAN | CAN |
| TYPE OF LOSS - FLOOD | CANNOT | CAN | CAN | CAN | |
| TYPE OF LOSS - TOTAL THEFT | CANNOT | CANNOT | CANNOT | CAN | CAN |
| INJURY - HEAD/SKULL WITHOUT LOSS OF CONSCIOUSNESS | CANNOT | CANNOT | CANNOT | CAN | CAN |
| INJURY - HEAD/SKULL WITH LOSS OF CONSCIOUSNESS | CANNOT | CANNOT | CANNOT | CANNOT | CAN |
| FATALITY | CANNOT | CANNOT | CANNOT | CANNOT | CAN |

SYSTEM AND METHOD FOR AUTOMATING INITIAL CLAIM ASSIGNMENT

CROSS REFERENCE TO RELATED APPLICATIONS

This application is related by subject matter to those disclosed in the following commonly assigned applications having U.S. application Ser. No. 11/486,613, client reference no. US-0095.01, filed on Jul. 13, 2006, and entitled "System and Method for Automating Initial Claim Assignment;" and having U.S. application Ser. No. 11/486,848, client reference no. US-0095.03, filed on Jul. 13, 2006, and entitled "System and Method for Automating Initial Claim Assignment." The disclosure of each application is incorporated by reference herein in its entirety.

TECHNICAL FIELD

This application relates generally to automated methods of workflow management, and in particular to systems and methods for assigning tasks to an individual based on skill profile information related to the tasks, skill information related to the individual, and work load and availability information related to the individual.

BACKGROUND

The evolution of automation of business tasks continues to expand at a dramatic pace. The business case for such automation is clear. Enterprises that can use automated systems to improve responsiveness to the customer can often gain a competitive advantage. It has been shown that for most processes, 90% of process time is attributed to information transfer time and 10% to the actual performance of the tasks. This need to allocate more time to the actual performance of tasks has led to significant effort to improve the automation of workflow.

Workflow relates to the movement of documents and/or tasks through a work process. The concept of Workflow incorporates the operational aspect of a work procedure, including the structure of the tasks, the actors who will perform the tasks, the order in which the tasks are performed, synchronization of the tasks, the information flow necessary to support the tasks and tracking of the status of the tasks.

Workflow Management is increasingly being exploited by businesses in a variety of industries. The objective of workflow management is the automation of processes involving combinations of human and machine-based activities, particularly those involving interaction with information technology. Heavy users of workflow management technology include industries such as insurance, banking, legal and general administration.

One of the challenges of effectively implementing a workflow management system, particularly in a service organization, is to automate the initial assignment of tasks once a service request has been received. The fundamental difficulty is one of matching the task to be performed with the individual having the requisite skills and availability to perform the task. In a typical approach to assigning a task to a service provider, a customer requests service (e.g. makes a claim under his/her insurance) from a customer representative. This may occur by way of a telephone call to a call center. The customer representative will typically collect information about the service being requested. In the case of an automobile insurance claim, the information may include the name of the insured, details about the accident, the vehicles involved, where the accident took place, the other party involved, the other party's insurance company, etc. The customer representative would collect the information and send it to a queue for further processing by the work unit that will accomplish the task. A work unit manager would review the requests for service in the queue and assign a service provider to handle the task. The assignment would go into the individual service provider queue. The individual service provider would then provide this service when he/she is ready to accomplish the request in his/her queue. One drawback of the typical process is that there is a significant time lag between the interaction with the customer by the customer representative and the actual assignment of the task to an individual service provider. Ideally, the customer would like to know the identity of the individual who will provide the service as soon as possible.

In the insurance industry, the assignment of a claim to a claim handler or claim adjuster is recognized as a significant bottleneck in delivering customer service. In many insurance companies auto and property claims (loss reports) are taken by claims representatives and assigned to a claim handler code associated with a work queue rather than a person. A group of designated representatives must then manually transfer the claim (loss) from the work queue to the claim handler code associated with the primary claims adjuster. In order to do this, they must manually classify the claim, manually determine which location and skill level of adjusters are appropriate to handle the claim, and manually determine which adjuster is next in line to receive an assignment.

A number of technology vendors market workflow systems (e.g. the Siebel 7.8 insurance module) that decompose a claim into segments while optimizing the assignment of these claim segments to claims adjusters and service providers. A "Score-Based Assignment" is used to automate the assignment of the claim to the claim adjuster and service providers based on a broad range of criteria, including skills or expertise, region, language, and workload. Another commercially available application, "Guidewire ClaimCenter," is described as providing automated, rules-driven segmentation and assignment of claims and exposures based on any attributes of the claim or the claims organization. Although many companies today claim to have automated segmentation and assignment processes, they lack the flexibility to support ever-changing business needs. Many of today's workflow management systems as implemented in the insurance industry have a problem dealing with the unavailability of claim handler's as a result of vacation, illness, overloading and the like. The result is that claims may be offered to too few, too many, or the wrong claim handlers.

In view of the above, it is desirable to provide a workflow system that is user-friendly and provides the flexibility to support evolving business needs. It is desirable to provide a workflow system that provides a recommendation of an individual who will handle a task to a customer service representative interacting with a customer. It is further desirable to provide the customer service representative with the ability to accept or override the recommendation. It is further desirable for the customer service representative to be able to tell the customer, at the initial customer interaction, the name and phone number of the person to whom the task has been assigned.

SUMMARY

Several embodiments of the present innovation are directed to assigning tasks to an individual based on skill profile information related to the tasks, skill information related to the individual, and work load and availability information related to the individual.

In one such method, the assignment of work is done by collecting information about a work item, classifying the information into one or more criteria, assigning a required skill profile to the criteria, searching for workers matching the skill profiles and determining the best-suited available worker to handle the work item.

In another method, having particular utility to the insurance industry, the automatic assignment of the claim handler is performed by collecting information about the claim to be assigned, classifying the information according to skill profiles that include a work skill level profile. A determination of the skill level required to handle the claim is then performed. The method concludes by searching a data store of claim handlers, selecting the claim handlers with the skill levels required to handle the claim and identifying the best-suited available claim handler to handle that particular claim. This methodology provides a feature that the appropriate adjuster will be recommended, and a customer service representative will have the ability to accept or override the recommendation. The methodology also provides the feature that workload for new assignments will be balanced across skill levels and jurisdictions.

There is also provided a methodology for selecting the best-suited participant to perform a new task by assigning a productivity factor to the task, calculating the time needed to complete all tasks assigned to a participant calculating the probable tasks that could have been assigned during the time interval, calculating the number of new tasks that the participant would be able handle and calculating the total probability of assigning the new task. Yet another feature provided by the methodology is that the customer service representative will be able to tell the customer the name and phone number of the primary adjuster in the initial call.

These and other features described in the present disclosure will become more fully apparent from the following description and obtained by means of the instruments and combinations particularly pointed out in the appended claims, or may be learned by the practice of the systems and methods set forth herein. This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following detailed description, are better understood when read in conjunction with the appended drawings. For the purpose of illustrating the claimed subject matter, there is shown in the drawings example constructions of various embodiments; however, the embodiments is not limited to the specific methods and instrumentalities disclosed. In the drawings:

FIG. 5 illustrates a representative example of a table that associates type of loss with skill level;

FIGS. 7-10 are screenshots illustrating an example user interface according to one embodiment.

DETAILED DESCRIPTION

Example Computing Devices

Figure 1:
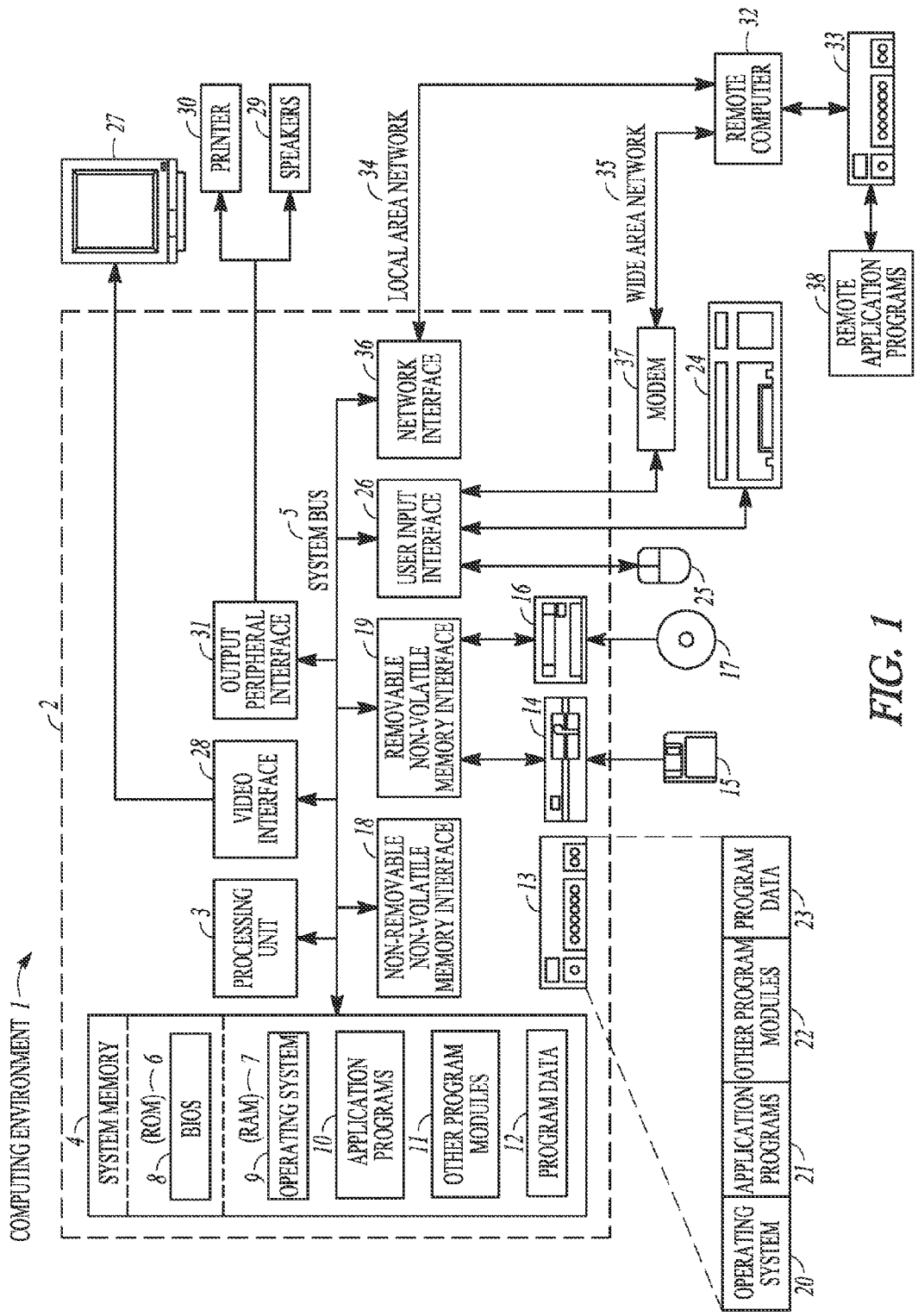
FIG. 1 is a block diagram illustrating an exemplary computing device suitable for implementing the processes in this disclosure.

Referring to FIG. 1, shown is a block diagram representing an exemplary computing device suitable for use in conjunction with implementing the processes described above. For example, the computer executable instructions that carry out the processes and methods for remotely authenticating credit card transactions may reside and/or be executed in such a computing environment as shown in FIG. 1. The computing system environment 1 is only one example of a suitable computing environment and is not intended to suggest any limitation as to the scope of use or functionality of the methods, systems and computer-readable media of this application. Neither should the computing environment 1 be interpreted as having any dependency or requirement relating to any one or combination of components illustrated in the exemplary computing environment 1.

Aspects of the methods, systems and computer-readable media of this application are operational with numerous other general purpose or special purpose computing system environments or configurations. Examples of well known computing systems, environments, and/or configurations that may be suitable for use with the methods, systems and computer-readable media of this application include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Aspects of the methods, systems and computer-readable media of this application may be implemented in the general context of computer-executable instructions, such as program modules, being executed by a computer. Generally, program modules include routines, programs, objects, components, data structures, etc. that perform particular tasks or implement particular abstract data types. Aspects of the methods, systems and computer-readable media of this application may also be practiced in distributed computing environments where tasks are performed by remote processing devices that are linked through a communications network. In a distributed computing environment, program modules may be located in both local and remote computer storage media including memory storage devices.

An exemplary system for implementing aspects of the methods, systems and computer-readable media of this application includes a general purpose computing device in the form of a computer 2. Components of computer 2 may include, but are not limited to, a processing unit 3, a system memory 4, and a system bus 5 that couples various system components including the system memory 4 to the processing unit 3. The system bus 5 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, the Peripheral Component Interconnect (PCI) bus also known as Mezzanine bus, as well as its successor, the PCI-Express standard.

Computer 2 typically includes a variety of computer readable media. Computer readable media can be any available media that can be accessed by computer 2 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 4 includes computer storage media in the form of volatile and/or nonvolatile memory such as read only memory (ROM) 6 and random access memory (RAM) 7. A basic input/output system 8 (BIOS), containing the basic routines that help to transfer information between elements within computer 2, such as during start-up, is typically stored in ROM 6. RAM 7 typically contains data and/or program modules that are immediately accessible to and/or presently being operated on by processing unit 3. By way of example, and not limitation, FIG. 1 illustrates operating system 9, application programs 10, other program modules 11, and program data 12.

The computer 2 may also include other removable/non-removable, volatile/nonvolatile computer storage media. By way of example only, FIG. 1 illustrates a hard disk drive 13 that reads from or writes to non-removable, nonvolatile magnetic media, a magnetic disk drive 14 that reads from or writes to a removable, nonvolatile magnetic disk 15, and an optical disk drive 16 that reads from or writes to a removable, non-volatile optical disk 17 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 13 is typically connected to the system bus 5 through an non-removable memory interface such as interface 18, and magnetic disk drive 14 and optical disk drive 16 are typically connected to the system bus 5 by a removable memory interface, such as interface 19.

The drives and their associated computer storage media discussed above and illustrated in FIG. 1, provide storage of computer readable instructions, data structures, program modules and other data for the computer 2. In FIG. 1, for example, hard disk drive 13 is illustrated as storing operating system 20, application programs 21, other program modules 22, and program data 23. Note that these components can either be the same as or different from operating system 9, application programs 10, other program modules 11, and program data 12. Operating system 20, application programs 21, other program modules 22, and program data 23 are given different numbers here to illustrate that, at a minimum, they are different copies. A user may enter commands and information into the computer 2 through input devices such as a keyboard 24 and pointing device 25, commonly referred to as a mouse, trackball or touch pad. Other input devices (not shown) may include a microphone, joystick, game pad, satellite dish, scanner, or the like. These and other input devices are often connected to the processing unit 3 through a user input interface 26 that is coupled to the system bus, but may be connected by other interface and bus structures, such as a parallel port, game port or a universal serial bus (USB). A monitor 27 or other type of display device is also connected to the system bus 5 via an interface, such as an insecure or secure video interface 28. An exemplary secure video standard would be the High-Definition Multimedia Interface (HDMI) standard. In addition to the monitor, computers may also include other peripheral output devices such as speakers 29 and printer 30, which may be connected through an output peripheral interface 31.

The computer 2 may operate in a networked environment using logical connections to one or more remote computers, such as a remote computer 32. The remote computer 32 may be a personal computer, a server, a router, a network PC, a peer device or other common network node, and typically includes many or all of the elements described above relative to the computer 2, although only a memory storage device 33 has been illustrated in FIG. 1. The logical connections depicted in FIG. 1 include a local area network (LAN) 34 and a wide area network (WAN) 35, but may also include other networks. Such networking environments are commonplace in offices, enterprise-wide computer networks, intranets and the Internet.

When used in a LAN networking environment, the computer 2 is connected to the LAN 34 through a network interface or adapter 36. When used in a WAN networking environment, the computer 2 typically includes a modem 37 or other means for establishing communications over the WAN 35, such as the Internet. The modem 37, which may be internal or external, may be connected to the system bus 5 via the user input interface 26, or other appropriate mechanism. In a networked environment, program modules depicted relative to the computer 2, or portions thereof, may be stored in the remote memory storage device. By way of example, and not limitation, FIG. 1 illustrates remote application programs 38 as residing on memory device 33. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the methods, systems and computer-readable media of this application, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the methods, systems and computer-readable media of this application. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the methods, systems and computer-readable media of this application, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the methods, systems and computer-readable media of this application in the context of one or more stand-alone computer systems, the methods, systems and computer-readable media of this application is not so limited, but rather may be implemented in connection with any computing environment, such as a network or distributed computing environment. Still further, aspects of the methods, systems and computer-readable media of this application may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the methods, systems and computer-readable media of this application should not be limited to any single embodiment, but rather should be construed in breadth and scope in accordance with the appended claims.

Figure 2:
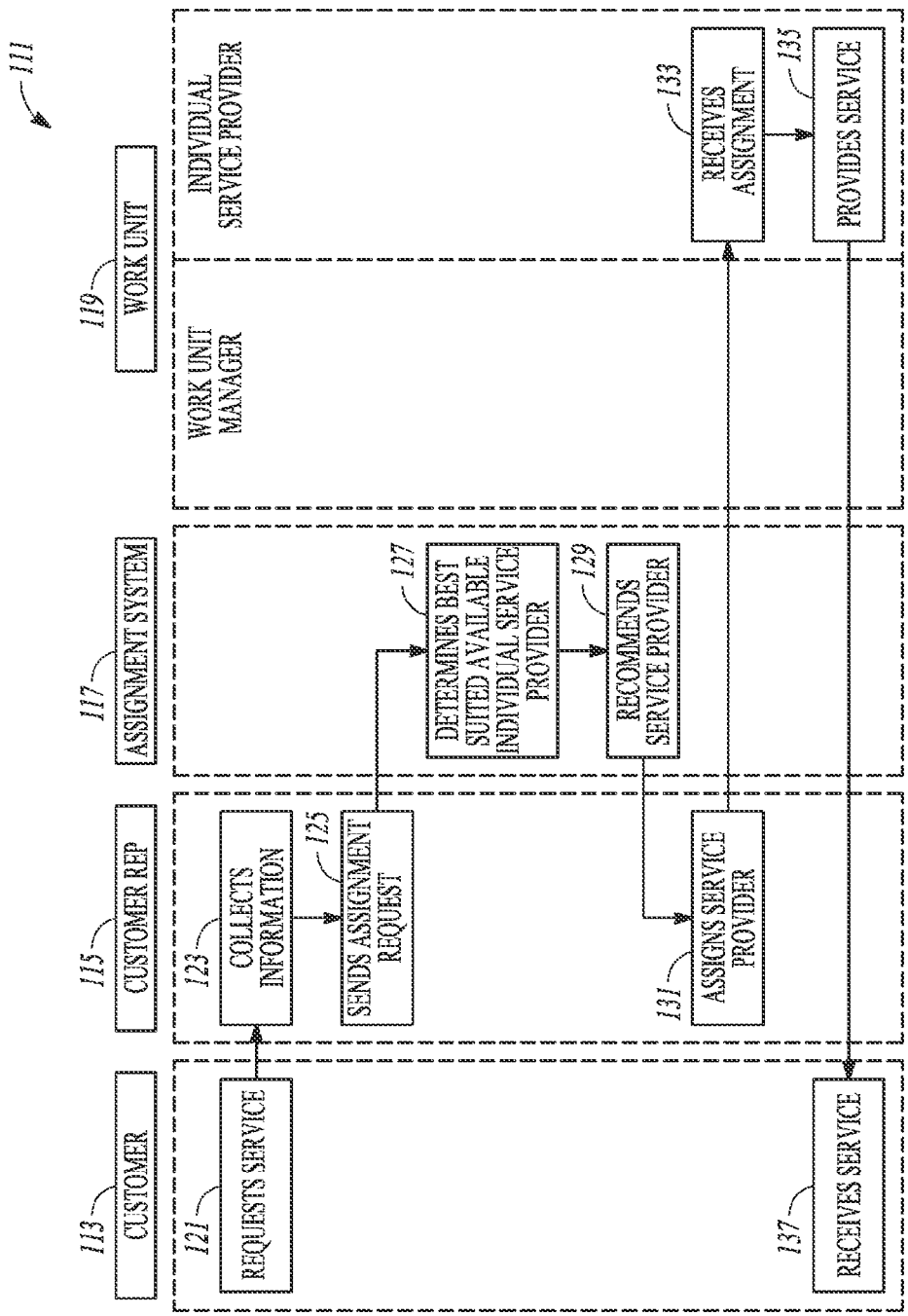
FIG. 2 illustrates the general environment in which the system and method could be employed.

Illustrated in FIG. 2 is a general environment 111 in which the system and method of automating an initial claim assignment that is the subject matter of this disclosure could be employed. In general, the systems and methods of this disclosure could be employed by a service organization that provides a service to a customer 113. The interaction with the customer 113 is generally provided by a customer representative 115 who may reside in a call center that provides customer service. An assignment system 117 is provided to enable the customer representative 115 to immediately assign an individual service provider residing in a work unit 119. In a typical application of the system, the customer 113 would request service (method element 121) from the customer representative 115. The customer representative 115 would collect information about the service requested (method element 123) and send a request for assignment all of an individual service provider (method element 125). The assignment system 117 determines the best-suited, available individual service provider to provide the service (method element 127) and recommends any individual service provider to whom the service request may be assigned (method element 129). The customer representative 115 would then assign the individual service provider (method element 131). The individual service provider would receive the assignment (method element 133), provide the service (method element 135) that would then be delivered to the customer 113 (method element 137). Although the system and methodologies described in this disclosure may be applicable with regard to any initial assignment of tasks in a complex work environment, the following examples illustrate this system and method in more detail in an insurance industry environment.

Figure 3:
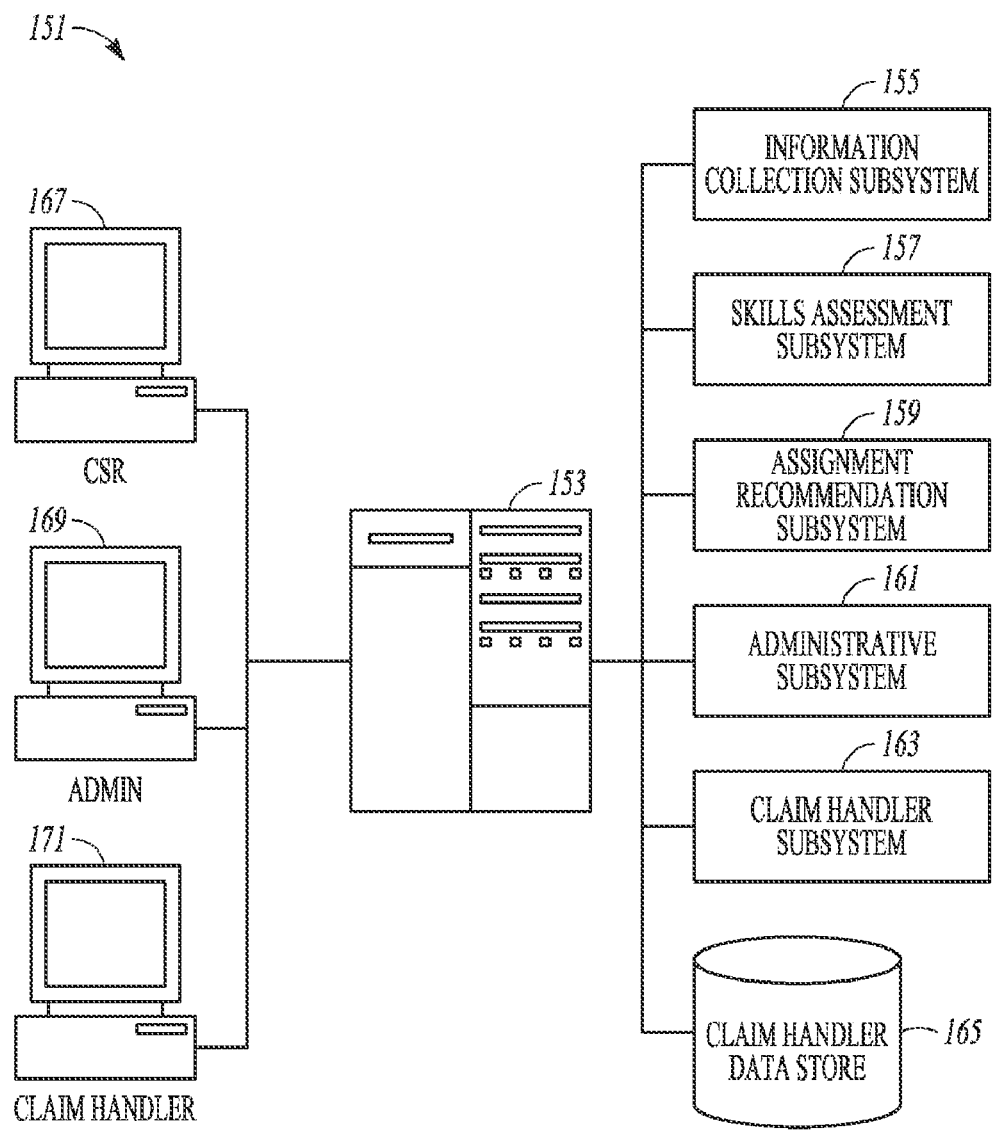
FIG. 3 illustrates a schematic of a system for automating an initial claim assignment.

Illustrated in FIG. 3 is a system 151 for automating an initial claim assignment. The system 151 includes a computer server 153. Associated with a computer server 153 are a number of application subsystems, including an information collection subsystem 155, a skills assessment subsystem 157, an assignment recommendation subsystem 159, and administrative subsystem 161, and a claim handle or subsystem 163. The function of each subsystem is described in more detail below. Also included in the system 151 is a data store 165 where claim handler information and other information accessed by the foregoing subsystems could reside. This system 151 also includes at least one client terminal 167 utilized by the customer service representative. The system 151 could also include at least one administrative client terminal 169, and at least one claim handler client terminal 171. As will be described in more detail below, the function of the information collection subsystem 155 is to enable the customer service representative to input all of the data relevant to the processing of a claim that is available to the customer at the time the customer makes contact with the customer service representative. The function of the skills assessment subsystem 157 is to determine, from the information provided through the information collection subsystem 155, what skills are required to process the claim. The function of the assignment recommendation subsystem 159 is to process the information regarding the skills required to handle the claim, and to determine the best-suited available individual claim handler to handle the claim. The function of the administrative subsystem is to enable a system administrator to maintain and manage the other subsystems. The function of the claim handler subsystem is to enable the claim handlers to provide information about their availability and access to handle a claim.

Figure 4:
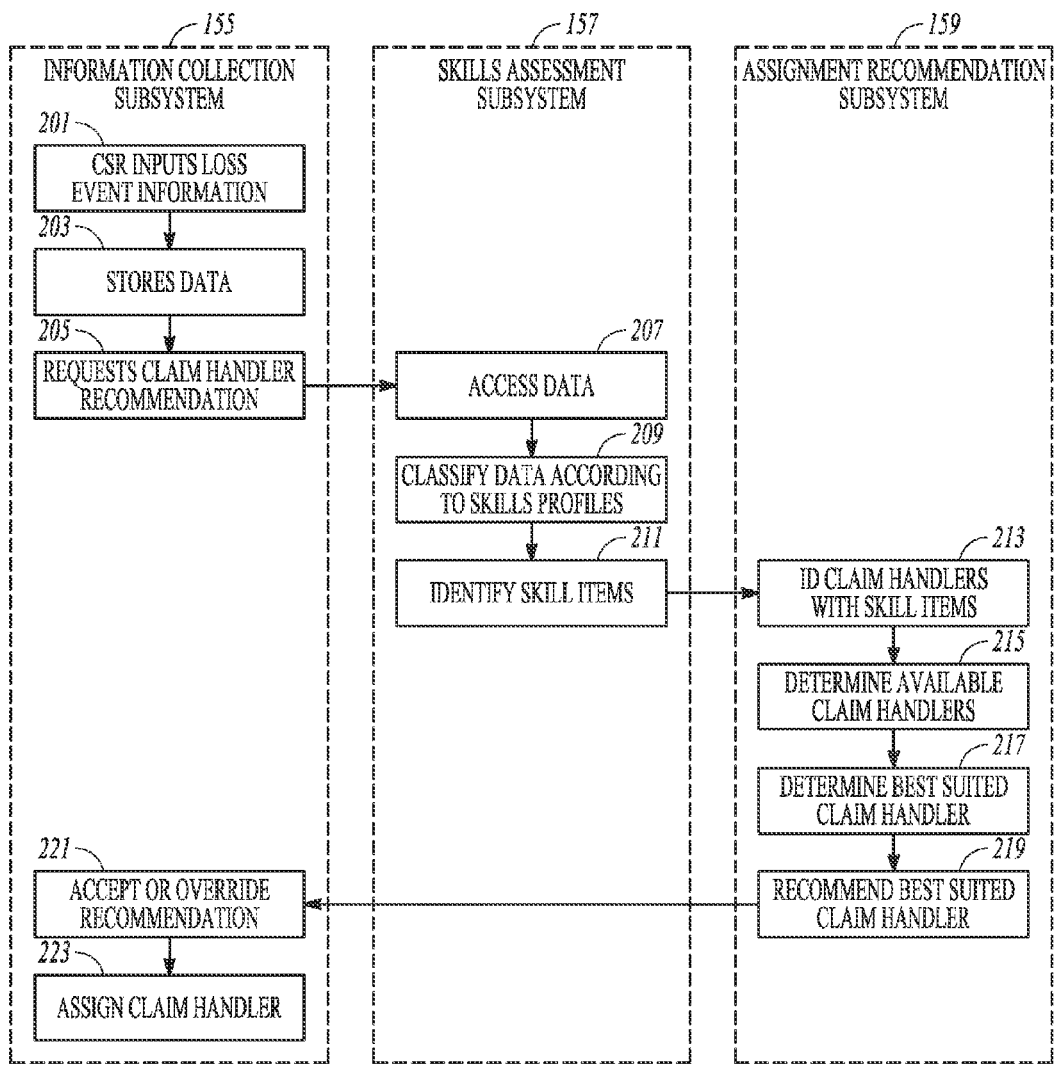
FIG. 4 illustrates the interaction of the information collection subsystem, the skills and assessment subsystem, and the assignment recommendation subsystem.

Illustrated in more detail in FIG. 4, is the interaction of the information collection subsystem 155, the skills assessment subsystem 157 and the assignment recommendation subsystem 159. The customer service representative accessing the information collection subsystem 155 would input the loss event information in method element 201. The information collection subsystem would store the loss event data (method element 203) and enable the customer service representative to request a recommendation for a claim handler (method element 205). The request would be processed by this skills assessment subsystem (SAS) 157 which would access the loss event data (method element 207) and classify the loss event (method element 209) according to a skills profile table. The SAS 157 identifies the skill items required to process the claim (method element 211) and forwards the information to the assignment recommendations subsystem (ARS) 159. The ARS 159 identifies claim handlers (method element 213) having the required skill items identified by the SAS 157. The ARS 159 determines which of the claim handlers having the requisite skills are available (method element 215) by accessing information in the claim handler data store 165 (shown in FIG. 2). The ARS 159 determines the best-suited claim handler (method element 217) through the use of an algorithm further described below. The recommendation of the best-suited claim handler would be submitted (method element 219) to the customer service representative through a user interface in the information collection subsystem 155. The customer service representative may then use the information collection subsystem 155 to accept or override the recommendation (method element 221) and assign a claim handler (method element 223). The customer service representative may then immediately provide the customer with the name and number of the claim handler who will process the customer's claim.

The process of classifying data according to skill profiles implemented by SAS 157 is accomplished by referring to a table correlating loss event information to skills required to handle the claim. Illustrated in FIG. 5 is a representative example of a table that can be used to correlate a type of loss with the skill level of the claim handler. In this example the skill level is represented by the title of the claim handler. Although titles may vary from organization to organization, within an organization there is a hierarchical structure of titles associated with claim handlers. For example, an abridged skills description for a claims representative may include:

"provides claims service to members/customers regarding the initial contact on all claims service events. Documents the loss, addresses immediate questions regarding the claims process and assigns the loss to the appropriate diary. Applies knowledge of coverage to initiate and/or conclude claims as appropriate."

An abridged skill description for a senior claims representative may provide:

"investigates, evaluates and settles moderately complex automobile claims (first and third party physical damage) in accordance with the terms and conditions of the policy contract."

An abridged skill description for a property claims examiner may provide:

"provides claims service to members/customers regarding the most complex and severe property claims."

It should be apparent that the definitions provided above, as well as the terminology for the titles of the claims examiner are merely illustrative, and may differ from organization to organization. Additionally, although six (6) examples of type of loss or injury are illustrated in FIG. 5, in the actual implementation of granularity of the injury or loss type may be much higher. For example, for automobile claims/losses the loss type may include: hail, collision, mechanical failure, vandalism, fire, and other loss types.

Skill profiles associated with claims maybe defined in a plurality of ways. For example, a skill profile may be defined around the concept of jurisdiction. Claim handlers may be assigned based on the geographic areas that they handle. Consequently a skill profile of jurisdiction may have skill items comprising States or countries. The United States may be subdivided into a number of regions such as: Central, Mid-Atlantic, Mountain States, New England, North East, Southwest, etc. Associated with the profile name Southwest would be states such as Texas, Oklahoma, etc.

Another profile type may be the line of business with which the claim is associated. Example of the line of business profile names include: Auto, Auto Liability, Property, etc. Skill items associated with the Property line of business may include Comprehensive Personal Liability, Fire, Homeowners, Renters, etc. Yet another profile type may include the type of handling desired for the particular customer (for example, standard handling or VIP handle, among others). Skill profiles provide an organization with the ability to segment the work in a manageable fashion. Skill profiles can be used to characterize claims and loss events and associate them with skill items which are in turn associated with individuals rather than organizational queues.

Figure 6:
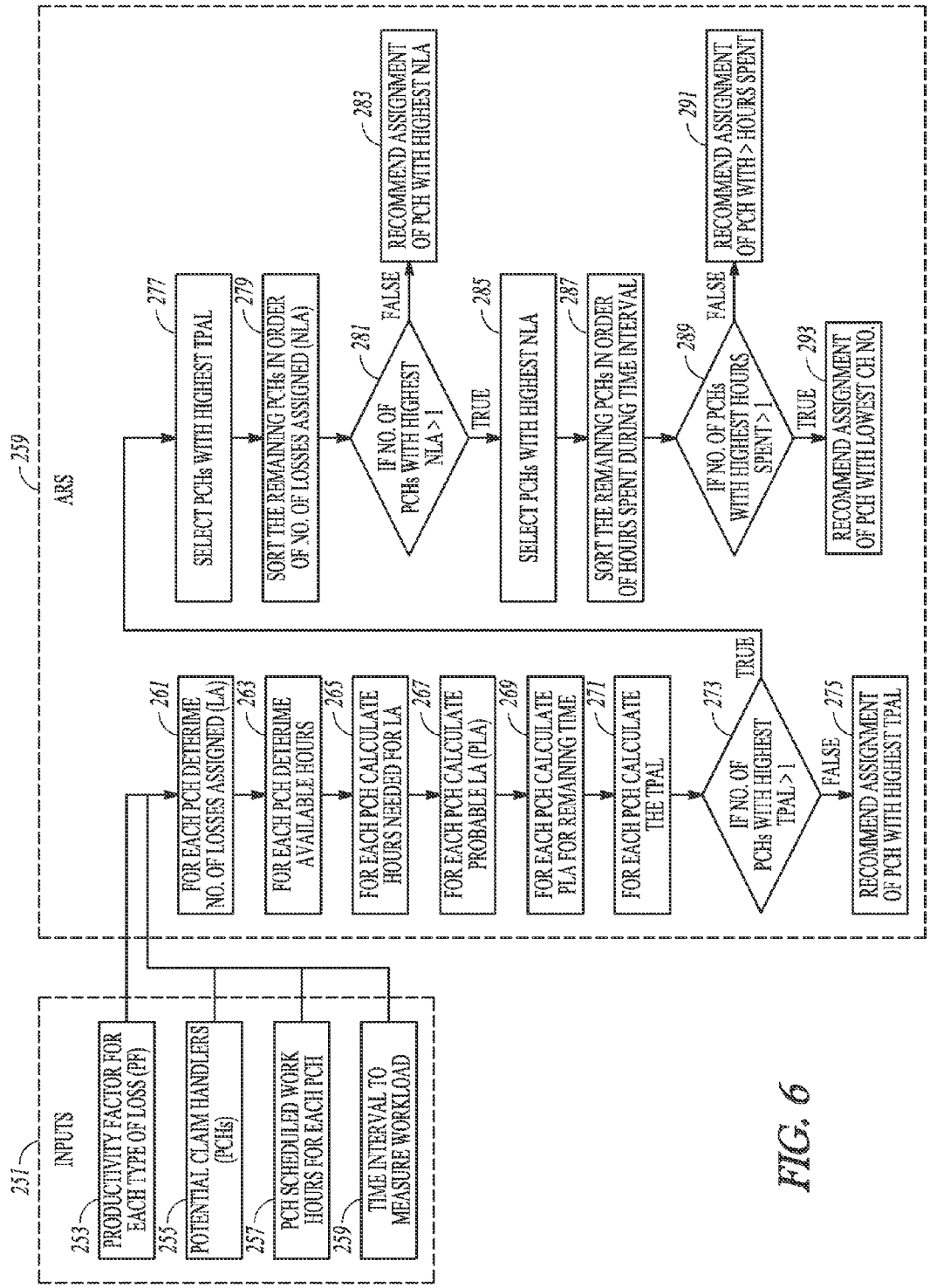
FIG. 6 is a flow chart illustrating an example balancing algorithm that may be utilized in the system.

Illustrated in FIG. 6 is the methodology implemented by the ARS 159. The ARS 159 receives inputs 251 that may be stored in the data store 165 or generated by the SAS 157 (see FIG. 3). Included in the inputs necessary for making a determination of the best-suited available claim handler is a productivity factor (PF) for each type of loss (method element 253). The PF is defined as the average time a person would need to work on that type of loss, and is a number developed by the business based on metrics of actual performance.

The SAS 157 provides a list 255 of potential claim handlers with the requisite skills to handle the particular type of loss. Another set of inputs utilized by the ARS 159 is the scheduled work hours 257 for each potential claim handler. The time interval that will be used to measure the workload 259 is another input. Typically the time interval to measure the workload 259 will be a work day and the scheduled work hours 257 would be the hours that the particular claim handler is scheduled to be at work on that day.

The ARS 159 determines the number of losses that have been assigned to each potential claim handler (LA) (method element 261) and determines the available hours for each potential claim handler (AH) (method element 263). The ARS 159 then calculates the hours needed for the potential claim handler to process the losses that have already been assigned to that claim handler (method element 265). This calculation is based on the number of losses assigned times PF for the loss (LA*PF). The probable losses that could have been assigned based on the time that a claim handler has already spent during the time interval is then calculated (method element 267). This calculation is based on the number of spent hours minus the hours needed for the losses assigned divided by the PF. The probable loss assignment based on remaining hours (PLA) is then calculated (method element 269). This number represents a number of losses of the claim handler can potentially handle based on available hours at any given point in time. This can be calculated by dividing the available hours by the PF. The calculation is done for each potential claim handler. The total probability of assigning the loss (TPAL) is calculated by adding the probable losses that could have been assigned to the probable loss assignment based on remaining hours. The best-suited available claim handler would be the PCH with the highest total probability of assigning the loss. If there is only one PCH, with the highest total probability of assigning the loss (decision node 273) then the ARS 159 would recommend that PCH to the customer representative. If there is more than one PCH sharing the highest total probability of assigning the loss, then that subset of PCHs are selected (method element 277) and sorted in decreasing order based on the number of losses assigned (NLA) to the PCH (method element 279). If there is only one PCH having the highest NLA (decision node 281) then the ARS 159 would recommend the PCH with the highest NLAs to the customer represented (method element 283). If there is more than one PCH sharing the highest number of losses assigned, then the PCHs sharing the highest NLAs would be selected (method element 285) and the selected PCHs would be sorted in decreasing order of hours spent (method element 287). If there is only one PCH with the highest hours spent (decision node 289) and the ARS would recommend assignment of the PCH with the highest number of hours spent (method element 291). If more than one of the remaining PCHs share the highest number of hours spent, then the system would recommend the PCH with the lowest claim handler number. The claim handler number is a unique number given to each claim handler.

The methodology illustrated in FIG. 6 can best be understood with the following illustrative examples. For the purposes of these examples the relevant time interval is a work day with a number of working hours is from 8 AM-5 PM. Furthermore, it is assumed that all the losses have the same complexity.

Example 1

Current Time: 8:00 AM, CH5 is unavailable for the day. Systematic loss assignment, CH1, CH2, CH3 and CH4 qualify for assignment.

| Claim Handler | CH1 | CH2 | CH3 | CH4 | CH5 |
|---|---|---|---|---|---|
| Time for | 8-5 | 8-5 | 8-5 | 8-5 | |
| Hours Spent | 0 | 0 | 0 | 0 | |
| Hours Available | 9 | 9 | 9 | 9 | |
| Number Of Losses assigned | 0 | 0 | 0 | 0 | |
| Productivity Factor | 1 Hr | 1 Hr | 1 Hr | 1 Hr | |
| Unavailability | 0 | 0 | 0 | 0 | 1 |

Since the initial loss count is 0 for all, we can assign it any of the participants. Assume P1 it is assigned, so his loss assignment count is set to 1.

Example 2

Current Time: 10 AM, CH5 is still unavailable.
CH2, CH3 and CH4 have each received a few assignments due to manual overrides between 8 and 10 AM.
Systematic loss assignment, CH1, CH2, CH3 and CH4 qualify for assignment.

| Claim Handler | CH1 | CH2 | CH3 | CH4 |
|---|---|---|---|---|
| Time | 8-5 | 8-5 | 8-5 | 8-5 |
| Hours Spent | 2 | 2 | 2 | 2 |
| Hours Available | 7 | 7 | 7 | 7 |
| Number Of Losses assigned | 1 | 4 | 5 | 2 |
| Productivity Factor | 1 Hr | 1 Hr | 1 Hr | 1 Hr |
| Unavailability | 0 | 0 | 0 | 0 |

For CH 1
Hours needed for Losses assigned=Number of Losses*Productivity Factor=1*1=1 Hours
Probable Losses that could have been assigned=(Hours Spent−Hours needed for Losses assigned)/Productivity Factor=2−1/1=1
Probable Loss Assignment based on remaining hours=Hours Available/Productivity=7/1=7
Total Probability of assigning the loss=Probable Losses that could have been assigned+Probable Loss Assignment based on remaining hours=1+7=8
For CH 2
Hours needed for Losses assigned=Number of Losses*Productivity Factor=4*1=4 Hours
Probable Losses that could have been assigned=(Hours Spent−Hours needed for Losses assigned)/Productivity Factor=2−/1=−2
Probable Loss Assignment based on remaining hours=Hours Available/Productivity=7/1=7
Total Probability of assigning the loss=Probable Losses that could have been assigned+Probable Loss Assignment based on remaining hours=−2+7=5
For CH 3
Hours needed for Losses assigned=Number of Losses*Productivity Factor=5*1=5 Hours
Probable Losses that could have been assigned=(Hours Spent−Hours needed for Losses assigned)/Productivity Factor=2−5/1=−3
Probable Loss Assignment based on remaining hours=Hours Available/Productivity=7/1=7
Total Probability of assigning the loss=Probable Losses that could have been assigned+Probable Loss Assignment based on remaining hours=−3+7=4
For CH 4
Hours needed for Losses assigned=Number of Losses*Productivity Factor=2*1=2 Hours
Probable Losses that could have been assigned=(Hours Spent−Hours needed for Losses assigned)/Productivity Factor=2−2/1=0
Probable Loss Assignment based on remaining hours=Hours Available/Productivity=7/1=7
Total Probability of assigning the loss=Probable Losses that could have been assigned+Probable Loss Assignment based on remaining hours=0+7=7
The claim handler with the maximum probability of assigning the loss is CH1, so CH1 gets the assignment here.

Example 3

Current Time: 12:00 Noon, CH 5 is available from 12-5.
Systematic loss assignment, CH1, CH2, CH3, CH4 and CH5 qualify for assignment.

| Claim Handler | CH1 | CH2 | CH3 | CH4 | CH5 |
|---|---|---|---|---|---|
| Time | 8-5 | 8-5 | 8-5 | 8-5 | 12-5 |
| Hours Spent | 4 | 4 | 4 | 4 | 0 |
| Hours Available | 5 | 5 | 5 | 5 | 5 |
| Number Of Losses assigned | 4 | 4 | 5 | 2 | 0 |
| Productivity Factor | 1 Hr | 1 Hr | 1 Hr | 1 Hr | 1 Hr |
| Unavailability | 0 | 0 | 0 | 0 | 0 |

For CH 1
Hours needed for Losses assigned=Number of Losses*Productivity Factor=4*1=4 Hours
Probable Losses that could have been assigned=(Hours Spent−Hours needed for Losses assigned)/Productivity Factor=4−4/1=0
Probable Loss Assignment based on remaining hours=Hours Available/Productivity=5/1=5
Total Probability of assigning the loss=Probable Losses that could have been assigned+Probable Loss Assignment based on remaining hours=0+5=5
For CH 2
Hours needed for Losses assigned=Number of Losses*Productivity Factor=4*1=4 Hours
Probable Losses that could have been assigned=(Hours Spent−Hours needed for Losses assigned)/Productivity Factor=4−4/1=0
Probable Loss Assignment based on remaining hours=Hours Available/Productivity=5/1=5
Total Probability of assigning the loss=Probable Losses that could have been assigned+Probable Loss Assignment based on remaining hours=0+5=5
For CH 3
Hours needed for Losses assigned=Number of Losses*Productivity Factor=5*1=5 Hours
Probable Losses that could have been assigned=(Hours Spent−Hours needed for Losses assigned)/Productivity Factor=4−5/1=−1
Probable Loss Assignment based on remaining hours=Hours Available/Productivity=5/1=5

Total Probability of assigning the loss=Probable Losses that could have been assigned+Probable Loss Assignment based on remaining hours=−1+5=4

For CH 4
Hours needed for Losses assigned=Number of Losses*Productivity Factor=2*1=2 Hours
Probable Losses that could have been assigned=(Hours Spent−Hours needed for Losses assigned)/Productivity Factor=4−2/1=2
Probable Loss Assignment based on remaining hours=Hours Available/Productivity=5/1=5
Total Probability of assigning the loss=Probable Losses that could have been assigned+Probable Loss Assignment based on remaining hours=2+5=7

For CH 5
Hours needed for Losses assigned=Number of Losses*Productivity Factor=0*1=0 Hours
Probable Losses that could have been assigned=(Hours Spent−Hours needed for Losses assigned)/Productivity Factor=0−0/1=0
Probable Loss Assignment based on remaining hours=Hours Available/Productivity=5/1=5
Total Probability of assigning the loss=Probable Losses that could have been assigned+Probable Loss Assignment based on remaining hours=0+5=5

In this example 3, CH 4 would have the maximum probability and would be recommended to handle the claim.

Example 4

Current Time: 1: PM, CH1, CH2, CH3, CH4 and CH5 received additional assignments. Systematic loss assignment, CH1, CH2, CH3, CH4 and CH5 qualify for assignment.

| Claim Handler | CH1 | CH2 | CH3 | CH4 | CH5 |
|---|---|---|---|---|---|
| Time | 8-5 | 8-5 | 8-5 | 8-5 | 12-5 |
| Hours Spent | 5 | 5 | 5 | 5 | 1 |
| Hours Available | 4 | 4 | 4 | 4 | 4 |
| Number Of Losses assigned | 8 | 9 | 7 | 4 | 1 |
| Productivity Factor | 1 Hr | 1 Hr | 1 Hr | 1 Hr | 1 Hr |
| Unavailability | 0 | 0 | 0 | 0 | 0 |

For CH 1
Hours needed for Losses assigned=Number Of Losses*Productivity Factor=8*1=1 Hours
Probable Losses that could have been assigned=(Hours Spent−Hours needed for Losses assigned)/Productivity Factor=5−8/1=−3
Probable Loss Assignment based on remaining hours=Hours Available/Productivity=4/1=4
Total Probability of assigning the loss=Probable Losses that could have been assigned+Probable Loss Assignment based on remaining hours=−3+4=1

For CH 2
Hours needed for Losses assigned=Number Of Losses*Productivity Factor=9*1=9 Hours
Probable Losses that could have been assigned=(Hours Spent−Hours needed for Losses assigned)/Productivity Factor=5−9/1=−4
Probable Loss Assignment based on remaining hours=Hours Available/Productivity=4/1=4
Total Probability of assigning the loss=Probable Losses that could have been assigned+Probable Loss Assignment based on remaining hours=−4+4=0

For CH 3
Hours needed for Losses assigned=Number Of Losses*Productivity Factor=7*1=7 Hours
Probable Losses that could have been assigned=(Hours Spent−Hours needed for Losses assigned)/Productivity Factor=5−7/1=−2
Probable Loss Assignment based on remaining hours=Hours Available/Productivity=4/1=4
Total Probability of assigning the loss=Probable Losses that could have been assigned+Probable Loss Assignment based on remaining hours=−2+4=2

For CH 4
Hours needed for Losses assigned=Number Of Losses*Productivity Factor=4*1=4 Hours
Probable Losses that could have been assigned=(Hours Spent−Hours needed for Losses assigned)/Productivity Factor=5−4/1=1
Probable Loss Assignment based on remaining hours=Hours Available/Productivity=4/1=4
Total Probability of assigning the loss=Probable Losses that could have been assigned+Probable Loss Assignment based on remaining hours=1+4=5

For CH 5
Hours needed for Losses assigned=Number of Losses*Productivity Factor=1*1=1 Hours
Probable Losses that could have been assigned=(Hours Spent−Hours needed for Losses assigned)/Productivity Factor=1−1/1=0
Probable Loss Assignment based on remaining hours=Hours Available/Productivity=4/1=4
Total Probability of assigning the loss=Probable Losses that could have been assigned+Probable Loss Assignment based on remaining hours=0+4=4

Here CH 4 has the maximum probability and is recommended for the assignment.

Example 5

Current Time: 2 PM. CH 4 is not available after 4:00, CH 5 available from 12-5

| Claim handler | CH 1 | CH 2 | CH 3 | CH 4 | CH 5 |
|---|---|---|---|---|---|
| Time | 8-5 | 8-5 | 8-5 | 8-4 | 12-5 |
| Hours Spent | 6 | 6 | 6 | 6 | 2 |
| Hours Available | 3 | 3 | 3 | 2 | 3 |
| Number Of Losses assigned | 8 | 9 | 7 | 4 | 2 |
| Productivity Factor | 1 Hr | 1 Hr | 1 Hr | 1 Hr | 1 Hr |
| Unavailability | 0 | 0 | 0 | 0 | 0 |

For CH 1
Hours needed for Losses assigned=Number of Losses*Productivity Factor=8*1=8 Hours
Probable Losses that could have been assigned=(Hours Spent−Hours needed for Losses assigned)/Productivity Factor=6−8/1=−2
Probable Loss Assignment based on remaining hours=Hours Available/Productivity=3/1=3
Total Probability of assigning the loss=Probable Losses that could have been assigned+Probable Loss Assignment based on remaining hours=−2+3=1

For CH 2
Hours needed for Losses assigned=Number of Losses*Productivity Factor=9*1=9 Hours Probable Losses that could have been assigned=(Hours Spent−Hours needed for Losses assigned)/Productivity Factor=6−9/1=−3
Probable Loss Assignment based on remaining hours=Hours Available/Productivity=3/1=3
Total Probability of assigning the loss=Probable Losses that could have been assigned+Probable Loss Assignment based on remaining hours=−3+3=0

For CH 3
Hours needed for Losses assigned=Number of Losses*Productivity Factor=7*1=7 Hours
Probable Losses that could have been assigned=(Hours Spent−Hours needed for Losses assigned)/Productivity Factor=6−7/1=−1
Probable Loss Assignment based on remaining hours=Hours Available/Productivity=3/1=3
Total Probability of assigning the loss=Probable Losses that could have been assigned+Probable Loss Assignment based on remaining hours=−1+3=2

For CH 4
Hours needed for Losses assigned=Number of Losses*Productivity Factor=4*1=4 Hours
Probable Losses that could have been assigned=(Hours Spent−Hours needed for Losses assigned)/Productivity Factor=6−4/1=2
Probable Loss Assignment based on remaining hours=Hours Available/Productivity=2/1=2
Total Probability of assigning the loss=Probable Losses that could have been assigned+Probable Loss Assignment based on remaining hours=2+2=4

For CH 5
Hours needed for Losses assigned=Number of Losses*Productivity Factor=2*1=2 Hours
Probable Losses that could have been assigned=(Hours Spent−Hours needed for Losses assigned)/Productivity Factor=2−2/1=0
Probable Loss Assignment based on remaining hours=Hours Available/Productivity=3/1=3
Total Probability of assigning the loss=Probable Losses that could have been assigned+Probable Loss Assignment based on remaining hours=0+3=3

Here CH 4 has the maximum probability and would be recommended.

The subject matter of the foregoing embodiments is described with specificity to meet statutory requirements. However, the description itself is not intended to limit the scope of this patent. Rather, the applicants have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 7:
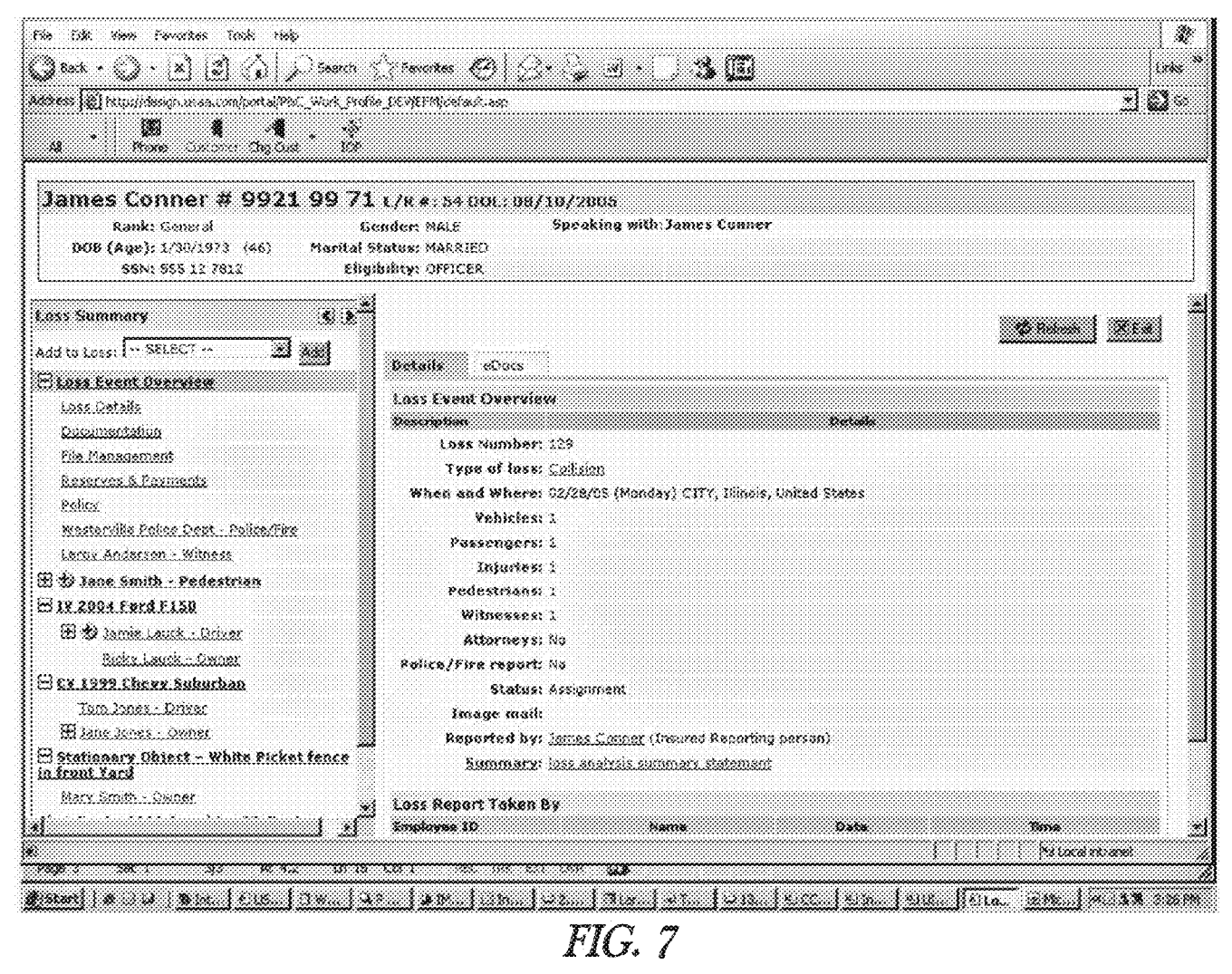
Figure 8:
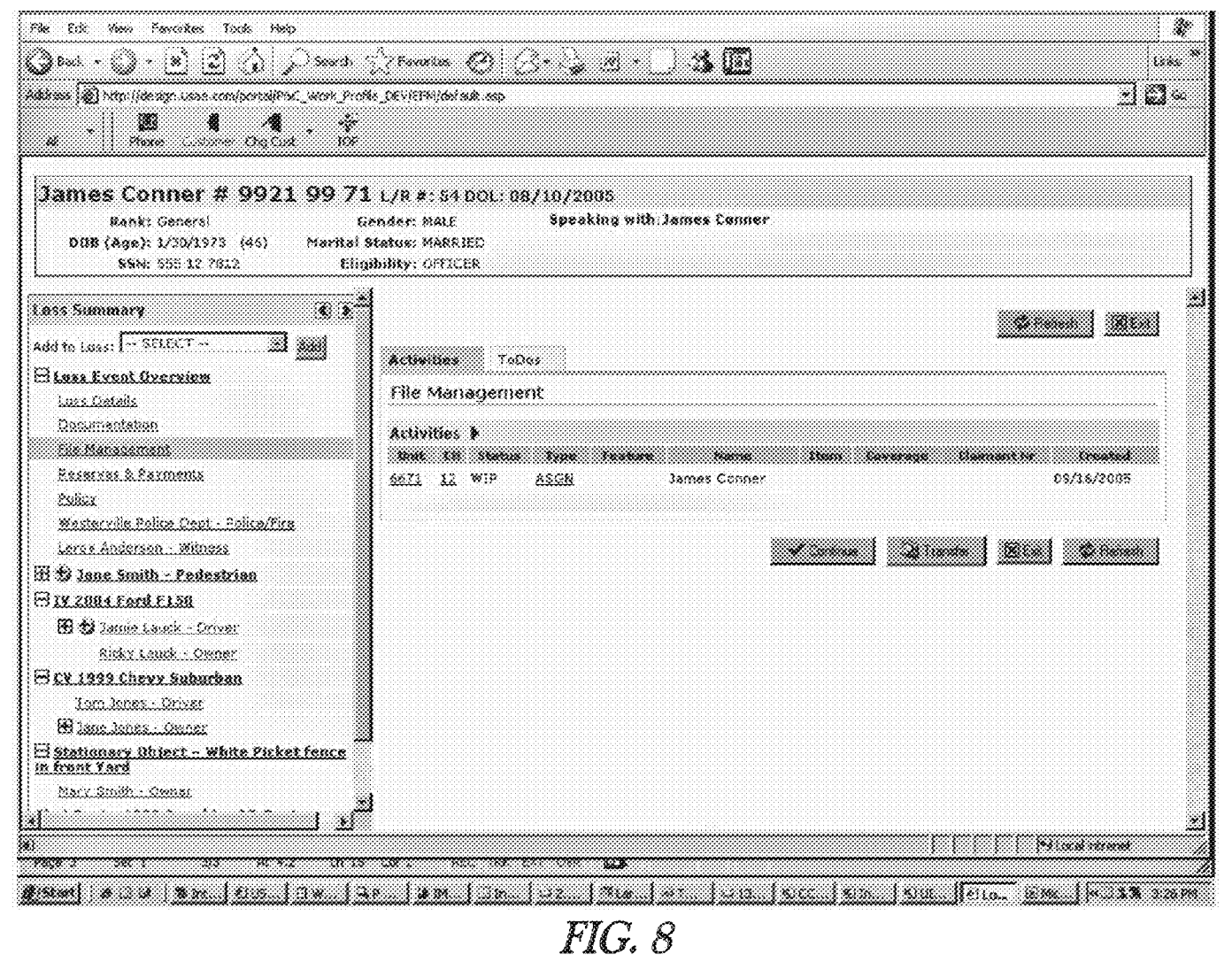
Figure 9:
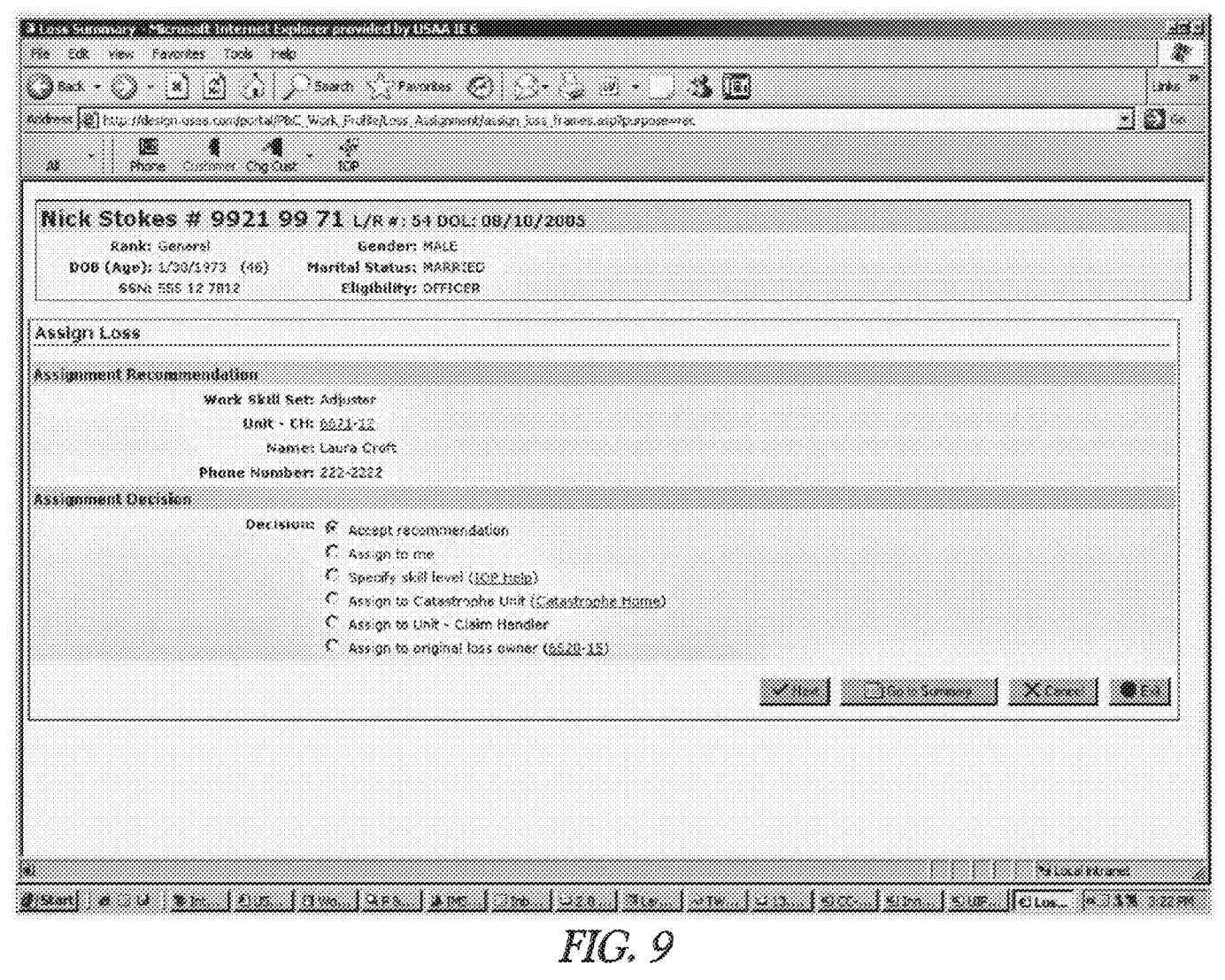
Figure 10:
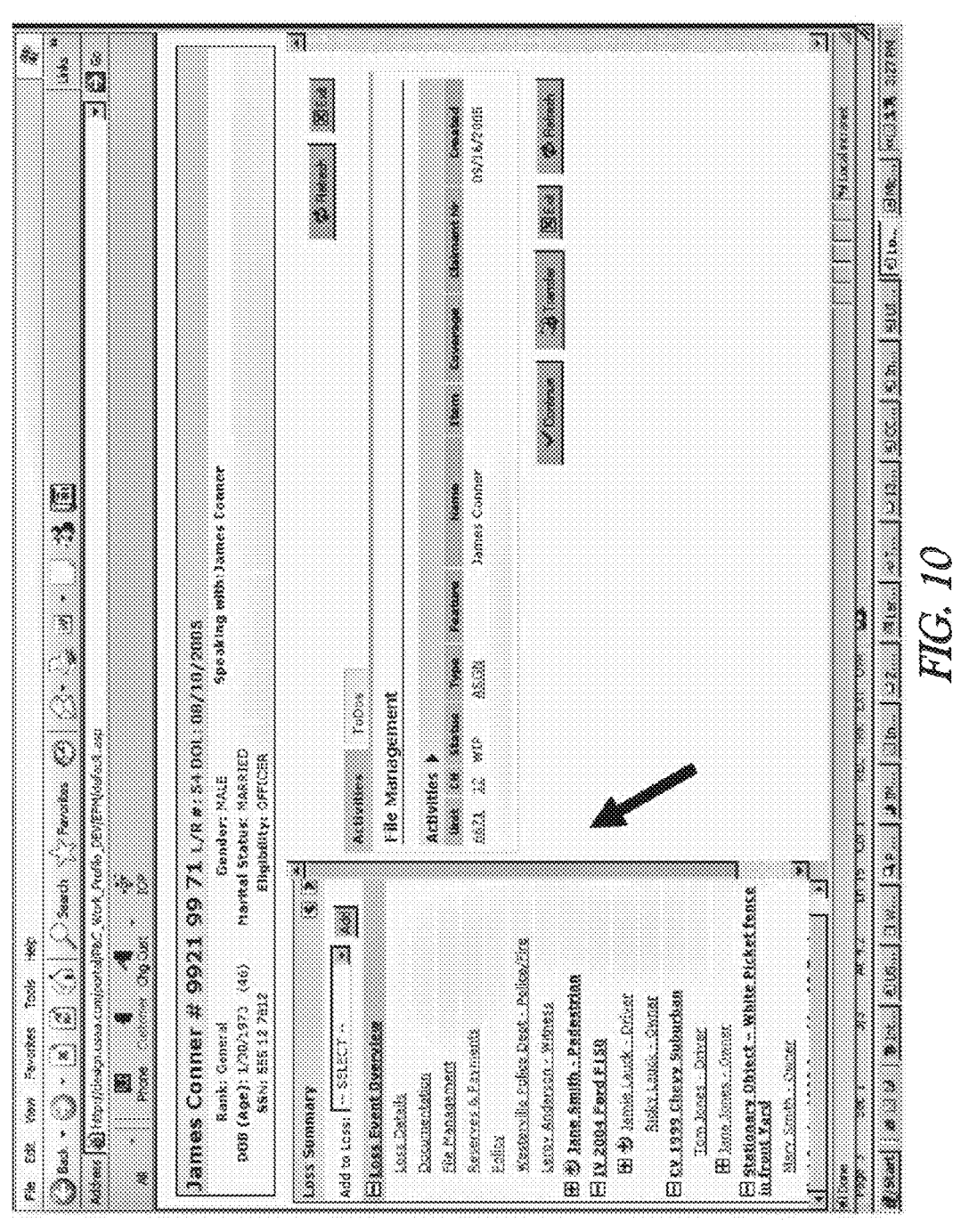

Illustrated in FIGS. 7 through 9 are representative examples of a graphical user interface that the customer service representative would be provided with as part of the information collection subsystem 155. The screen display FIG. 6 illustrates display that the customer service representative would use to collect information about a particular loss event. In the example illustrated in FIG. 6 it is evident that the type of loss is a collision, involving one vehicle, one passenger, one pedestrian, etc. once the customer service representative has collected all the data regarding the loss, the customer service representative would click on the file management hyperlink. A new window will pop up as illustrated in FIG. 7 which enables the customer service representative to engage the system for automating initial claim assignment, by clicking on the ASGN hyperlink on the file management window. A new assign loss page would be displayed (FIG. 10) which would include the assignment recommendation from the ARS 159, and provide the customer service representative with a number of options, including accepting the recommendation, or overriding the recommendation by directly assigning it to another claim handler.

The various techniques described herein may be implemented with hardware or software or, where appropriate, with a combination of both. Thus, the methods and apparatus of the present embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, where the machine becomes an apparatus for practicing the embodiments. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and systems of the present embodiments may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the embodiments. When implemented on a general-purpose processor, the program code combines with the processor to provide a unique apparatus that operates to perform the indexing functionality of the present embodiments.

While preferred embodiments have been described, it is to be understood that other similar embodiments may be used or modifications and additions may be made to the described embodiments for performing the same function without deviating therefrom. Therefore, the present disclosure is not limited to any single embodiment, but rather should be construed in breadth and scope in accordance with the appended claims.

What is claimed is:

1. A system to process an insurance claim comprising at least one subsystem that:
   includes a memory and one or more processors in a number of computing apparatuses, wherein the one or more processors execute program instructions stored in the memory such that the at least one subsystem:
   collects information about losses to be covered by and data relevant to processing of the insurance claim;
   classifies said information into a plurality of skill profiles including a work skill level profile;
   determines a skill level required to handle the claim;
   searches a data store having records of claim handlers, skill profiles associated with such claim handlers and at least one parameter from among the following group of parameters: skill levels associated with said claim handlers, availability of said claim handlers, and workload of said claim handlers;

provides a recommendation to assign the insurance claim to an available claim handler with the requisite skill level;

provides the option to accept or override the recommendation; and assigns a claim handler to process the insurance claim in real time wherein a customer service representative provides a customer with identification and contact information of the claim handler during an initial interaction, wherein the subsystem that provides the recommendation to assign the insurance claim comprises at least one subsystem that:

determines a number of service requests currently assigned to the claim handler;

determines a number of hours that the claim handler spent on processing other claims;

determines a future availability of hours for the claim handler to process new claims;

calculates a total probability of assigning the claim by:

determining probable claims that could have been assigned to each claim handler at a given point in time by subtracting hours needed for service requests currently assigned from the number of hours that the claim handler spent on processing other claims to calculate a difference, and dividing the difference by a productivity factor;

determining a number of claims that each claim handler could potentially handle based on available hours at the given point in time by dividing the future availability of hours for the claim handler to process new claims by the productivity factor; and calculating the total probability of handling the claim by adding the probable claims that could have been assigned to each claim handler at the given point in time to the number of claims that each claim handler could potentially handle based on available hours at the given point in time; and recommends the claim handler with the highest total probability number.

2. The system of claim 1 further comprising at least one subsystem that:

selects a set of claim handlers with the skill level required to handle the claim; and identifies the available claim handler from said set of claim handlers based on availability and workload.

3. The system of claim 1 wherein said subsystem that classifies said information into a plurality of skill profiles comprises at least one subsystem that:

classifies said information into a jurisdiction profile;

classifies said information into a line of business profile; and classifies said information into a customer handling profile.

4. The system of claim 1 wherein said subsystem that determines the skill level required to handle the claim comprises at least one subsystem that:

accesses a table that correlates a subset of said plurality of skill profiles with a skill level required to process the claim; and identifies a minimum skill level necessary to process the claim.

5. The system of claim 1 further comprising at least one subsystem that assigns the claim to the available claim handler.

6. A method processing an insurance claim comprising:

utilizing a memory and one or more processors in a number of computing apparatuses, wherein the one or more processors execute program instructions stored in the memory to perform the method for;

collecting information about losses to be covered by and data relevant to processing of the insurance claim;

classifying said information into a plurality of skill profiles including a work skill level profile;

determining a skill level required to handle the claim;

searching a data store having records of claim handlers, skill profiles associated with such claim handlers, and at least one parameter from among the following group of parameters: skill levels associated with said claim handlers, availability of said claim handlers, and workload of said claim handlers;

providing a recommendation to assign the insurance claim to an available claim handler with the requisite skill level;

providing the option to accept or override the recommendation; and assigning, through execution of the instructions by the one or more processors, a claim handler to process the insurance claim in real time wherein a customer service representative provides a customer with identification and contact information of the claim handler during an initial interaction, wherein providing a recommendation to assign the insurance claim to an available claim handler comprises:

determining a number of service requests currently assigned to the claim handler;

determining a number of hours that the claim handler spent on processing other claims;

determining future availability of hours for the claim handler to process new claims;

calculating a total probability of assigning the claim, wherein calculating the total probability comprises:

determining probable claims that could have been assigned to each claim handler at a given point in time by subtracting hours needed for service requests currently assigned from the number of hours that the claim handler spent on processing other claims to calculate a difference, and dividing the difference by a productivity factor;

determining a number of claims that each claim handler could potentially handle based on available hours at the given point in time by dividing the future availability of hours for the claim handler to process new claims by the productivity factor; and calculating the total probability of handling the claim by adding the probable claims that could have been assigned to each claim handler at the given point in time to the number of claims that each claim handler could potentially handle based on available hours at the given point in time; and recommending the claim handler with the highest total probability number.

7. The method of claim 6 further comprising:

selecting a set of claim handlers with the skill level required to handle the claim; and identifying the available claim handler from said set of claim handlers based on availability and workload.

8. The method of claim 6 wherein said method element of classifying said information into a plurality of skill profiles comprises:

classifying said information into a jurisdiction profile;

classifying said information into a line of business profile; and classifying said information into a customer handling profile.

9. The method of claim 6 wherein said method element of determining the skill level required to handle the claim comprises:

accessing a table that correlates a subset of said plurality of skill profiles with a skill level required to process the claim; and identifying a minimum skill level necessary to process the claim.

10. The method of claim 6 further comprising assigning the claim to the available claim handler.

11. A tangible computer-readable medium comprising instructions, which when executed by a computer, cause the computer to:

collect information about losses to be covered by and data relevant to processing of the insurance claim;

classify said information into a plurality of skill profiles including a work skill level profile;

determine a skill level required to handle the claim;

search a data store having records of claim handlers, skill profiles associated with such claim handlers and at least one parameter from among the following group of parameters: skill levels associated with said claim handlers, availability of said claim handlers, and workload of said claim handlers;

provide a recommendation to assign the insurance claim to an available claim handler with the requisite skill level;

provide the option to accept or override the recommendation; and assign a claim handler to process the insurance claim in real time wherein a customer service representative provides a customer with identification and contact information of the claim handler during an initial interaction, wherein the instructions to provide a recommendation to assign the insurance claim further comprise instructions to:

determine a number of service requests currently assigned to the claim handler;

determine a number of hours that the claim handler spent on processing other claims;

determine a future availability of hours for the claim handler to process new claims; and calculate a total probability of assigning the claim by:

determining probable claims that could have been assigned to each claim handler at a given point in time by subtracting hours needed for service requests currently assigned from the number of hours that the claim handler spent on processing other claims to calculate a difference, and dividing the difference by a productivity factor;

determining a number of claims that each claim handler could potentially handle based on available hours at the given point in time by dividing the future availability of hours for the claim handler to process new claims by the productivity factor; and calculating the total probability of handling the claim by adding the probable claims that could have been assigned to each claim handler at the given point in time to the number of claims that each claim handler could potentially handle based on available hours at the given point in time; and recommend the claim handler with the highest total probability number.

12. The computer-readable medium of claim 11 further comprising instructions to:

select a set of claim handlers with the skill level required to handle the claim; and identify the available claim handler from said set of claim handlers based on availability and workload.

13. The computer-readable medium of claim 11 wherein said instructions to classify said information into a plurality of skill profiles comprises instructions to:

classify said information into a jurisdiction profile;

classify said information into a line of business profile; and classify said information into a customer handling profile.

14. The computer-readable medium of claim 11 wherein said instructions to determine the skill level required to handle the claim comprises instructions to:

access a table that correlates a subset of said plurality of skill profiles with a skill level required to process the claim; and identify a minimum skill level necessary to process the claim.

15. The computer-readable medium of claim 11 further comprising instructions to assign the claim to the available claim handler.

\* \* \* \* \*